United States Patent Office 3,660,385
Patented May 2, 1972

3,660,385
2-(5-NITRO-2-FURFURYLIDENE)-1-TETRALONES
Rudolf Albrecht, Hans-Joachim Kessler, and Eberhard Schroder, Berlin, Germany, assignors to Schering Aktiengesellschaft, Berlin, Germany
No Drawing. Filed July 16, 1970, Ser. No. 55,593
Claims priority, application Germany, July 19, 1970,
P 19 37 630.8
Int. Cl. C07d 5/16, 27/22, 63/12
U.S. Cl. 260—240 A                    25 Claims

ABSTRACT OF THE DISCLOSURE 2-(5-nitro-2-furfurylidene)-1-tetralones of the formula

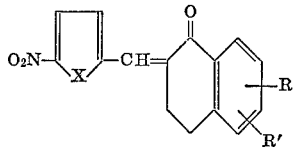

wherein X is O, S, —NH— or —NCH$_3$—; R is a free or esterified hydroxy group, hydroxyalkoxy, acyloxyalkoxy, alkoxyalkoxy, dialkylaminoalkoxy, pyrrolidinoalkoxy, piperidinoalkoxy, morpholinoalkoxy, piperazinoalkoxy, acylamino, amino, alkylsulfonylamino, monoalkylamino, dialkylamino, carboxy, carbalkoxy or nitro; and R' is a hydrogen atom, a halogen atom, an alkyl group, or a free, etherified or esterified hydroxy group, have anti-trichomonadal activity.

BACKGROUND OF THE INVENTION

This invention relates to novel 2-(5-nitro-2-furfurylidene)-1-tetralones.

Japanese patent application 25,256/1965 discloses 2-(5-nitro-2-furfurylidene)-tetralones which are unsubstituted on the benzene ring, or are substituted by a halogen atom, a lower alkyl or alkoxy group, or a cyano group. These compounds are said to exhibit an antimicrobial effect against E. coli, shigellae, and Mycobacterium tuberculosis.

It has now been found that the structurally related compounds of this invention exhibit excellent activity against trichomonads.

SUMMARY OF THE INVENTION

This invention relates to compounds of the formula

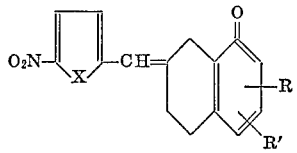

wherein X is an oxygen or sulfur atom or an —NH— or —NCH$_3$— group; and R is a free or esterified hydroxy group, hydroxyalkoxy, acyloxyalkoxy, alkoxyalkoxy, dialkylaminoalkoxy, pyrrolidinoalkoxy, morpholinoalkoxy, piperazinoalkoxy, acylamino, amino, alkylsulfonylamino, monoamino, dialkylamino, carboxy, carbalkoxy or nitro; and R' is a hydrogen atom, a halogen atom, an alkyl group, or a free, etherified or esterified hydroxy group, both in free base form and in the form of acid addition salts when the molecule contains a basic amino group.

DETAILED DISCUSSION

This invention embraces compounds of Formula I both in free base form and in the form of an acid addition salt with a physiologically compatible acid when the molecule contains an amino group. Examples of physiologically acceptable acids are hydrochloric acid, sulfuric acid, phosphoric acid, acetic acid, propionic acid, lactic acid, succinic acid, tartaric acid, citric acid, benzoic acid, salicylic acid, nicotinic acid and heptagluconic acid.

Other pharmaceutically acceptable acid addition salts, i.e., of acids which do not materially increase the toxicity of the compounds of this invention, include salts of other mineral acids, such as, for example, hydriodic, hydrobromic, metaphosphoric and nitric as well as salts of organic acids such as, for example, malic, glycolic, gluconic and arylsulfonic, e.g., p-toluene sulfonic acids.

The acid addition salts of this invention are not limited to those formed with pharmaceutically acceptable acids. Other acids, e.g., those formed with perchloric and other toxic and/or unstable acids are useful for isolation, characterization and purification of the free base. These acid addition salts can, if desired, thereafter be converted back to the free base and acid addition salts of pharmaceutically acceptable acids, employing conventional procedures.

In the compounds of this invention, R and R' each can be a freee or esterified —OH group.

When R' is an etherified —OH group, the ether group can be alkoxy containing 1 to 5 carbon atoms, e.g., meethoxy, ethoxy, propoxy, isopropoxy, butoxy, tertiarybutoxy, amyloxy, and the like.

When R' is an esterified —OH group, the ester group can be an acyloxy group of the formula alkyl-COO— containing 1 to 5 carbon atoms in the alkyl group.

When R is an esterified hydroxy group, the ester group can be an ester of an aliphatic or aromatic carboxylic or sulfonic acid containing 1 to 10 carbon atoms, preferably 2 to 7 carbons atoms, such as, for example, acetic, propionic, butyric, isobutyric, valeric, isovaleric acid, carbocyclic aryl acid, e.g., benzoic acid, cinnamic acid, alkanesulfonic acid, e.g., methanesulfonic and butanesulfonic acid, and carbocyclic arylsulfonic acid, e.g., p-toluenesulfonic acid.

Other examples of esterified hydroxy R groups are those in which the ester group is acyloxy wherein the acyl group is the acyl radical of, for example, another loweraliphatic acid, e.g., formic, trimethylacetic, 2-methylbutyric, 3-ethylbutyric, hexanoic, diethylacetic, triethylacetic, heptanoic, octanoic, α-ethylisovaleric, acyclic acid, e.g., cyclopropylideneacetic, a cycloaliphatic acid, e.g., cyclopentylformic, cyclopentylacetic, β-cyclopentylpropionic, cyclohexylformic, cyclohexylacetic, β-cyclohexylpropionic, an aryl or alkaryl acid, e.g., 2, 3, or 4-methylbenzoic, 2,3-, 2,4- 2,5-, 2,6-, 3,4- and 3,5-dimethylbenzoic, ethylbenzoic, 2,4,6 - trimethylbenzoic, 3-methyl-α-naphthoic, an aralkyl acid, e.g., phenylactic, phenylpropionic, a dibasic acid, e.g., succinic, glutaric, α-methylglutaric, β-methylglutaric, β,β-dimethylglutaric, adipic, pimelic, suberic, a hydroxy acid, e.g., glycolic, lactic, citric, tartaric, d-maleic, d-glyceric, mannonic, gluconic, salicylic, an amino acid, e.g., glycine, diglycollamic, triglycollamic, methylglycine, dimethylglycine, diethylglycine, para-aminosalicylic, para-aminobenzoic, other heterosubstituted acids, e.g., ethylmercaptoacetic, benzyl-mercaptoacetic, cyanoacetic, chloracetic, fluoroacetic, trichloroacetic, trifluoroacetic, thioglycolic, 2,3,4-trimethoxybenzoic, α - naphthoxyacetic, β-pyrrolidylpropionic, carbamic acids, e.g., carbamic acid, phenylcarbamic, n-butylcarbamic, dimethylcarbamic, diethylcarbamic, allophanic, or a heterto-cyclic acid, e.g., β-furylcarboxylic, N-methylpyrrolidyl-2-carboxylic, α-picolinic, indole-2-carboxylic, 6-hydroxyindolyl-3-acetic, N-methylmorpholyl-2-carboxylic and pyrrolyl-2-carboxylic acid.

Other examples of esterified R—OH groups in which the ester is a sulfonyloxy group are those in which the sulfonyl group is another arylsulfonyl, e.g., benzenesulfonyl, m,m' - dimethylbenzenesulfonyl, o,o' - dimethylbenzenesulfonyl, symtrimethylbenzenesulfonyl, sym.-triethylbenzenesulfonyl, m-ethylbenzenesulfonyl, para-isopropylbenzenesulfonyl, m-n-butylbenzenesulfonyl, or another alkylsulfonyl, e.g., ethylsulfonyl, propylsulfonyl, isopropylsulfonyl, butylsulfonyl, tert.-butylsulfonyl, isoamylsulfonyl, hexylsulfonyl, heptylsulfonyl, octylsulfonyl, or heterocyclic sulfonyl, e.g., α-pyridinesulfonyl, α-pyranesulfonyl, α-thiophenesulfonyl, α-furansulfonyl, α-tetrahydrofuransulfonyl, or other alkyl-, carbocyclic and heterocyclic aryl-, alkaryl- and aralkylsulfonyl group, preferably one containing 1–8 carbon atoms and 0–2, preferably 0–1 N, S or O hetero atoms, which are preferably ring carbon atoms, in the R' group.

When R is an etherified hydroxy group, R can be hydroxyalkoxy, acyloxyalkoxy or alkoxyalkoxy wherein acyloxy and alkoxy have the values given above.

In the compounds of this invention, R can also be a primary, secondary or tertiary amino group or aminoalkoxy group.

Preferred N-substituted amino groups are mono- and dialkylamino groups, wherein each alkyl group contains 1 to 5 carbon atoms, e.g., methylamino, ethylamino, n-propylamino, isopropylamino, butylamino, isobutylamino, amylamino, dimethylamino, methylethylamino, diethylamino, methyl-n-propylamino, dipropylamino, diisopropylamino, methyl-isobutylamino, di-n-butylamino and methyl-amylamino.

Other examples of substituted amino are those wherein the amino nitrogen atom is mono-substituted or disubstituted with saturated hydrocarbon other than alkyl, or unsaturated hydrocarbon, containing 1 to 5 carbon atoms or, together with the N-atom, forms a heterocyclicamino substituent containing, e.g., 1 to 14, preferably 1 to 6 carbon atoms and 1 to 3, preferably 1 or 2 heteroatoms including the amino nitrogen atom and 0 to 3, preferably 0 to 1 rings, which substituent can be substituted by one or more alkyl groups of 1 to 5 carbon atoms, and contain an N-, O- or S-atom in addition to the amino nitrogen atom as a ring member, e.g., pyrrolidino, 2-methylpyrrolidino, 2,5 - dimethylpyrrolidino, 3 - ethylpyrrolidino, piperidino, homopiperidino, morpholino, imidazole, triazole, tetrazole, oxazole, dioxazole, isothiazole, pyridazine, pyrimidine, piperazine, N' - lower - alkyl, N-β-hydroxy-lower - alkyl and N'-lower-alkoxy-alkyl-piperazine, isoxazine, morpholine, indole, benzoxazine, anilino, N-lower-alkylanilino, benzylamino, N-lower-alkyl-benzylamino, o-toluidino, p-toluidino and N-lower-alkyl-phenylethylamino.

R can also be a corresponding amido group, e.g., an acylated or sulfonylated amino group, e.g., wherein the acyl or sulfonyl group is acetyl-, propionyl-, butyryl-, methanesulfonyl-, benzenesulfonyl-, toluenesulfonyl or other acyl or sulfonyl group as defined hereinafter.

R can also be an aminoalkoxy group wherein the alkoxy group contains 2 to 4 carbon atoms, preferably 2, and the amino group is a primary, secondary or tertiary amino group as defined above.

Preferred of the N-substituted aminoalkoxy R groups are saturated and unsaturated mono- and dialkylaminoethoxy, free and esterified mono- and di-(hydroxyalkyl)-aminoethoxy, mono- and di-(acyloxyalkyl)-aminoethoxy, mono- and dicycloalkylaminoethoxy, pyrrolidinoethoxy, piperidinoethoxy, hexa-, octa, and decamethyleniminoethoxy, piperazinoethoxy, and morpholinoethoxy wherein the alkyl groups contain 1 to 5 carbon atoms and the cycloalkyl group contains 5 or 6 carbon atoms. The cyclicamino groups can be substituted on a ring carbon atom and the N'-amino nitrogen atom, in the case of the piperazine ring, by alkyl, hydroxy, acyloxy, acyl, hydroxyalkyl, or acyloxyalkyl containing 1 to 5 carbon atoms in the alkyl and/or acyl groups, and can be attached directly or via an alkylene group.

R' can also be H or a halogen atom, i.e., Cl, Br, I or F.

The following are preferred classes of compounds of this invention defined by Formula I:

(a) X is —O—;
(b) R is a 6-position substituent;
(c) R is —OH;
(d) R is NH₂;
(e) R is di-lower-alkyl-amino;
(f) R is 2-hydroxyethoxy;
(g) R is 2-di-lower-alkyl-amino-ethoxy;
(h) R is 2-pyrrolidinoethoxy, 2-piperidinoethoxy or 2-morpholinoethoxy;
(i) R' is H;
(j) a combination of (a) and any one of (a)–(i);
(k) a combination of (a), (i) and any one of (b)–(h); and
(l) a combination of (a), (b), (i) and any one of (c)–(h).

The compounds of Formula I are produced by reacting an aldehyde of the formula

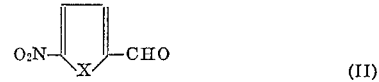

wherein X has the values given above, or the O-diacetate thereof, with a tetralone derivative of the formula

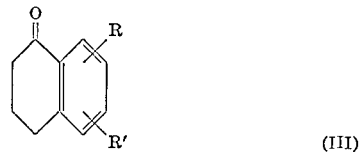

wherein R and R' have the values given above, in orthophosphoric acid, or in an acid anhydride, or in acetic acid, in the presence of concentrated sulfuric acid, acrylating a free hydroxyl group, converting a free amino group into the acid addition salt or amide thereof and/or liberating a bound amino group, when such groups are present in the molecule of the reaction product.

The condensation is normally conducted at elevated temperatures. Compounds with a free hydroxyl or amino group are simultaneously acylated when the condensation is conducted in an acid anhydride. Acyloxy and acylamino derivatives can, however, also be produced by acylating compounds of Formula I containing a free hydroxyl or amino group, respectively, in the usual manner with an acid chloride or acid anhydride.

The compounds of this invention exhibit very good inhibitory values against Trichomonas vaginalis as compared to conventional trichomonacidal compounds, demonstrated by the following table:

| Compound: | MIC [1] (mg./ml.) [2] |
|---|---|
| Metronidazole | 1.56 |
| 2 - (5 - nitro-2-furfurylidene)-tetralone (Japanese Pat. 25,256/1965 | 1.56 |
| 2 - (5 - nitro - 2 - furfurylidene)-6-hydroxy-1-tetralone | 0.024 |
| 2 - (5 - nitro - 2 - furfurylidene)-6-acetoxy-1-tetralone | 0.39 |
| 2 - (5 - nitro-2-furfurylidene)-6-amino-1-tetralone | 0.024 |
| 2 - (5 - nitro - 2 - furfurylidene)-6-(2-hydroxyethoxy)-tetralone | 0.024 |
| 2 - (5 - nitro - 2 - furfurylidene) - 6-dimethylamino-1-tetralone | 0.098 |
| 2 - (5 nitro - 2 - furfurylidene)-6-(2-acetoxyethoxy)-1-tetralone | 0.20 |
| 2 - (5 - nitro - 2 - furfurylidene)-6-(2-dimethylaminoethoxy)-1-tetralone hydrochloride | 0.098 |
| 2 - (5 - nitro - 2 - furfurylidene)-6-(2-pyrrolidinoethoxy)-1-tetralone sulfate | 0.05 |
| 2 - (5 - nitro - 2 - furfurylidene)-6-(2-morpholinoethoxy)-1-tetralone hydrogen sulfate | 0.05 |

[1] Minimum inhibitory concentration.
[2] Against Trichomonas vaginalis in the tube test.

The toxicity of the compound of this invention is minor.

The compounds can be employed in the treatment of trichomoniasis, especially Trichomonas vaginalis vaginal infections. The agent can be administered in the forms customarily employed in pharmaceuticals. For oral administration, especially suitable are tablets, dragées, capsules, pills, suspensions and solutions. Suitable excipients for tablets are, for example, lactose, amylose, talc, gelatin, magnesium stearate, etc.

For topical administration, suitable are powders, solutions, suspensions, aerosols, and vaginal suppositories. For parenteral application, aqueous and oily solutions or suspensions can be employed.

The compounds of this invention are formulated so as to provide, for example, 0.1–0.5 g. of the effective agent in admixture with 0.1 to 5 g. of a pharmacologically indifferent excipient, i.e., a pharmaceutically acceptable carriers, per unit dosage, e.g., per tablet.

The novel effective agents are usually administered in amounts of between 0.1 and 2.0 g. per patient per day.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

EXAMPLE 1

2-(5-nitro-2-furfurylidene)-6-hydroxy-1-tetralone 1.63 g. (10 millimols) of 6-hydroxy-1-tetralone and 1.41 g. (10 millimols) of 5-nitrofurfural are agitated in 10 ml. of orthophosphoric acid (85%) for 2½ days at room temperature. Then, the reaction mixture is poured into ice water, the solid product is filtered off and recrystallized from dioxane. Yield: 0.35 g. (12% of theory); M.P. 240° C. (decomposition).

$C_{15}H_{11}NO_5$ (285.3). Calculated (percent): N, 4.91. Found (percent): N, 4.90.

EXAMPLE 2

2-(5-nitro-2-furfurylidene)-6-acetoxy-1-tetralone 20.7 g. (0.101 mol) of 6-acetoxy-1-tetralone and 14.3 g. (0.101 mol) of 5-nitrofurfural are boiled under reflux in 250 ml. of acetic anhydride for 5 hours, and then cooled to −50° C. The crystals are filtered off and recrystallized from ethyl acetate. Yield: 6.5 g. (19% of theory); M.P. 200–203° C. (decomposition).

$C_{17}H_{13}NO_6$ (327.3). Calculated (percent): N, 4.28. Found (percent): N, 4.22.

EXAMPLE 3

2-(5-nitro-2-furfurylidene)-6-n-butyryloxy-1-tetralone 2.99 g. (13 mmol) of 6-n-butyryloxy-1-tetralone and 1.82 g. (13 mmol) of 5-nitrofurfural are heated in 5 ml. of n-butyric acid anhydride for 5 hours to 150° C. Then, the reaction mixture is mixed with ethyl acetate, and the solution is washed with water, dried over $Na_2SO_4$, and evaporated. The residue is recrystallized from ethyl acetate. Yield: 1.0 g. (21% of theory); M.P. 118–120° C.

$C_{19}H_{17}NO_6$ (355.4). Calculated (percent): N, 3.94. Found (percent): N, 3.87.

EXAMPLE 4

2-(5-nitro-2-furfurylidene)-6-propionyloxy-1-tetralone

This compound is produced analogously to Example 3, but in propionic acid anhydride; recrystallization from ethyl acetate. Yield: 34% of theory; M.P. 157–159° C. (decomposition).

$C_{18}H_{15}NO_6$ (341.3). Calculated (percent): N, 4.10. Found (percent): N, 3.97

EXAMPLE 5

2-(5-nitro-2-furfurylidene)-6-methanesulfonyloxy-1-tetralone 1.6 g. (6.7 mmol) of 6-methanesulfonyloxy-1-tetralone and 1.4 g. (10 mmol) of 5-nitrofurfural are agitated in 40 ml. of orthophosphoric acid for 5 hours at 50° C., poured into ice water, and the filtered-off solid product is recrystallized from ethyl acetate. Yield: 2.4 g. (99% of theory); M.P. 201–203° C. (decomposition).

$C_{16}H_{13}NO_7S$ (363.3). Calculated (percent): N, 3.86; S, 8.84. Found (percent): N, 3.86; S, 8.94.

EXAMPLE 6

2-(5-nitro-2-furfurylidene)-7-nitro-1-tetralone 255 mg. (1.3 mmol) of 7-nitro-1-tetralone and 188 mg. (1.3 mmol) of 5-nitrofurfural are agitated in 5 ml. of orthophosphoric acid for 6 hours at 60° C. The reaction mixture is poured into ice water, and the insoluble product is recrystallized from ethanol/ethyl acetate. Yield: 250 mg. (59% of theory); M.P. 210–211° C. (decomposition).

$C_{15}H_{10}N_2O_6$ (314.3). Calculated (percent): N, 8.92. Found (percent): N, 8.82.

EXAMPLE 7

2-(5-nitro-2-furfurylidene)-6-(2-hydroxyethoxy)-1-tetralone 1.0 g. (4.85 mmol) of 6-(2-hydroxyethoxy)-1-tetralone and 1.18 g. (4.85 mmol) of 5-nitrofurfural diacetate are heated in 10 ml. of orthophosphoric acid for 5 hours to 80° C., poured into ice water, and the insoluble product is recrystallized from ethanol and nitromethane. Yield: 0.7 g. (43% of theory); M.P. 157–162° C.

$C_{17}H_{15}NO_6$ (329.3). Calculated (percent): N, 4.25. Found (percent): N, 4.34.

EXAMPLE 8

2-(5-nitro-2-furfurylidene)-6-(2-ethoxyethoxy)-1-tetralone

This compound is prepared analogously to Example 5 from 6-(2-ethoxyethoxy)-1-tetralone; recrystallization from ethanol. Yield: 1.9 g. (54% of theory); M.P. 128–129° C.

EXAMPLE 9

2-(5-nitro-2-furfurylidene)-6-(2-dimethylaminoethoxy)-1-tetralone hydrochloride 538 mg. (2 mmol) of 6-(2-dimethylaminoethoxy)-1-tetralone hydrochloride and 282 mg. (2 mmol) of 5-nitrofurfural are agitated in 10 ml. of orthophosphoric acid for 20 hours at 50° C. The reaction mixture is poured into ice water, neutralized with $NaHCO_3$, and shaken out with ethyl acetate. The ethyl acetate solution is washed with water, dried over $Na_2SO_4$, and evaporated. The residue is dissolved in 30 ml. of ethanol and 30 ml. of ethyl acetate, mixed with 5 ml. of concentrated HCl, and stirred for one hour. Then, the reaction mixture is concentrated and the residue recrystallized from ethanol. Yield: 300 mg. (38% of theory); M.P. >260° C.

$C_{19}H_{21}ClN_2O_5$ (392.9). Calculated (percent): N, 7.13; Cl, 9.03. Found (percent): N, 7.05; Cl, 8.88.

EXAMPLE 10

2-(5-nitro-2-furfurylidene)-6-amino-1-tetralone 2.03 g. (10 mmol) of 6-acetylamino-1-tetralone and 2.43 g. (10 mmol) of 6-acetylamino-1-tetralone and 2.43 g. (10 mmol) of 5-nitrofurfural diacetate are agitated in 20 ml. of orthophosphoric acid for 16 hours at 80° C., poured into ice water, and the solid product recrystallized from ethanol. Yield: 250 mg. (8% of theory); M.P. 215–217° C. (decomposition).

$C_{15}H_{12}N_2O_4$ (284.3). Calculated (percent): N, 9.84. Found (percent): N, 9.63.

EXAMPLE 11

2-(5-nitro-2-furfurylidene)-6-acetylamino-1-tetralone

This compound is prepared analogously to Example 1, but from 6-acetylamino-1-tetralone and with a reaction time of 4 days. The product is recrystallized from ethyl acetate. Yield: 27% of theory; M.P. 242° C. (decomposition).

$C_{17}H_{14}N_2O_5$ (326.3). Calculated (percent): N, 8.58. Found (percent): N, 8.34.

EXAMPLE 12

2-(5-nitro-2-furfurylidene)-6-methanesulfonyl-amino-1-tetralone

This compound is produced analogously to Example 5 from 6-methanesulfonylamino-1-tetralone; the product is recrystallized from dimethylformamide. Yield: 44% of theory; M.P. 243–246° C. (decomposition).

$C_{16}H_{14}N_2O_6S$ (362.4). Calculated (percent): N, 7.73; S, 8.84. Found (percent): N, 7.36; S, 8.76.

EXAMPLE 13

2 - (5-nitro-2-furfurylidene)-6-dimethylamino-1-tetralone 0.5 g. (2.64 mmol) of 6-dimethylamino-1-tetralone and 0.64 g. (2.64 mmol) of 5-nitrofurfural diacetate are agitated in 10 ml. of orthophosphoric acid for 5 hours at 80° C., poured into ice water, and the solid product is recrystallized from ethanol. Yield: 0.4 g. (48% of theory); M.P. 213° C.

$C_{17}H_{16}N_2O_4$ (312.3). Calculated (percent): N, 8.97. Found (percent): N, 9.28.

EXAMPLE 14

2-(5-nitro-2-furfurylidene)-6-carboxy-1-tetralone

This compound is prepared analogously to Example 13 from 1-tetralone-6-carboxylic acid, with recrystallization from dimethylformamide. Yield: 61% of theory; M.P. 270° C. (decomposition).

$C_{16}H_{11}NO_6$ (313.3). Calculated (percent): N, 4.47. Found (percent): N, 4.54.

EXAMPLE 15

2-(5-nitro-2-furfurylidene)-6-carbomethoxy-1-tetralone

This compound is produced analogously to Example 13 from the methyl ester of 1-tetralone-6-carboxylic acid, with recrystallization from dimethylformamide. Yield: 46% of theory; M.P. 226–228° C. (decomposition).

$C_{17}H_{13}NO_6$ (327.3). Calculated (percent): N, 4.30. Found (percent): N, 4.34.

EXAMPLE 16

2-(5-nitro-2-furfurylidene)-6-acetoxyethoxy-1-tetralone 0.2 g. (0.61 mmol) of 2-(5-nitro-2-furfurylidene)-6-hydroxyethoxy-1-tetralone is heated in 10 ml. of acetic anhydride for 1 hour to 100° C., concentrated, and the crystalline product recrystallized from ethyl acetate. Yield: 0.05 g. (22% of theory); M.P. 147° C.

$C_{19}H_{17}NO_7$ (371.3). Calculated (percent): N, 3.77. Found (percent): N, 3.86.

EXAMPLE 17

2-(5-nitro-2-thenylidene)-6-acetoxy-1-tetralone 1.3 g. (6.37 mmol) of 6-acetoxy-1-tetralone and 1.0 g. (6.37 mmol) of 5-nitrothiophene-2-carboxaldehyde are boiled under reflux in 20 ml. of acetic anhydride for 5 hours, cooled to −50° C., and the crystallized product is filtered off and recrystallized from ethyl acetate. Yield: 600 mg. (28% of theory); M.P. 187–191° C. (decomposition).

$C_{17}H_{13}NO_5S$ (343.4). Calculated (percent): N, 4.08; S, 9.34. Found (percent): N, 3.97; S, 9.39.

EXAMPLE 18

2-(5-nitro-2-pyrrolylmethylene)-6-carbomethoxy-1-tetralone 408 mg. (2 mmol) of 6-carbomethoxy-1-tetralone and 280 mg. (2 mmol) of 5-nitropyrrole-2-carboxaldehyde are stirred in 10 ml. of orthophosphoric acid for 6 hours at 60° C. The reaction mixture is poured into ice water, the solid product is filtered off and recrystallized from ethyl acetate. Yield: 350 mg. (54% of theory); M.P. 250–251° C.

$C_{17}H_{14}N_2O_5$ (326.3). Calculated (percent): N, 8.58. Found (percent): N, 8.69.

EXAMPLE 19

2-(5-nitro-N-methyl-2-pyrrolylmethylene)-6-hydroxy-1-tetralone 324 mg. (2 mmol) of 6-hydroxy-1-tetralone and 308 mg. (2 mmol) of 5-nitro-N-methylpyrrole-2-carboxaldehyde are agitated in 10 ml. of 85% orthophosphoric acid for 7 hours at 70° C. The reaction mixture is poured into ice water, and the thus-precipitated product is purified by chromatography on silica gel with ethyl acetate, with recrystallization from ethanol. Yield: 80 mg.; M.P. 245° C. (decomposition).

$C_{16}H_{14}N_2O_4$ (298.3). Calculated (percent) N, 9.39. Found (percent): N, 9.08.

EXAMPLE 20

2-(5-nitro-2-furfurylidene)-6-(2-pyrrolidinoethoxy)-1-tetralone sulfate 0.89 g. (3 mmol) of 6-(2-pyrrolidinoethoxy)-1-tetralone hydrochloride and 0.42 g. (3 mmol) of 5-nitrofurfural are heated in 1.5 ml. of acetic acid and 0.32 g. (3.3 mmol) of concentrated sulfuric acid for 6 hours to 100° C.; the reaction mixture is mixed with water, and the solid product is filtered off and recrystallized from ethanol. Yield: 0.60 g.; M.P. 152° C. (decomposition).

$C_{21}H_{24}N_2O_9S$ (480.5). Calculated (percent): C, 58.45; H, 5.37; N, 6.49; S, 3.71. Found (percent): C, 58.52; H, 5.60; N, 6.28; S, 3.87.

EXAMPLE 21

2-(5-nitro-2-furfurylidene)-6-(2-morpholinoethoxy)-1-tetralone hydrogen sulfate

This compound is produced analogously to Example 20 from 0.62 g. (2 mmol) of 6-(2-morpholinoethoxy)-1-tetralone hydrochloride and 0.28 g. (2 mmol) of 5-nitrofurfural in 1 ml. of acetic acid and 0.216 g. (2.2 mmol) of concentrated sulfuric acid, with recrystallization from ethanol/dimethylformamide 1:1. Yield: 0.40 g.; M.P. 222° C. (decomposition).

$C_{21}H_{24}N_2O_{10}S$ (496.5). Calculated (percent): C, 50.80; H, 4.87; N, 5.64; S, 6.46. Found (percent): C, 50.93; H, 5.14; N, 5.90; S, 6.07.

EXAMPLE 22

2-(5-nitro-2-furfurylidene)-6-(2-piperidinoethoxy)-1-tetralone hydrogen sulfate

This compound is prepared analogously to Example 20 from 0.62 g. (2 mmol) of 6-(2-piperidinoethoxy-1-tetralone hydrochloride and 0.28 g. (2 mmol) of 5-nitrofurfural in 1 ml. of acetic acid and 0.216 g. (2.2 mmol) of concentrated sulfuric acid, with recrystallization from ethanol. Yield: 0.52 g.; M.P. 161° C. (decomposition).

$C_{22}H_{26}N_2O_9S$ (494.5). Calculated (percent): N, 5.67; S, 6.49. Found (percent): N, 5.50; S, 6.37.

EXAMPLE 23

(a) 2-(5-nitro-2-furfurylidene)-7-acetoxy-6-fluoro-1-tetralone 2.16 g. (12 mmol) of 6-fluoro-7-hydroxy-1-tetralone and 1.69 g. (12 mmol) of 5-nitrofurfural are boiled under reflux in 10 ml. of acetic anhydride for 2 hours. After cooling, the crystallized product is filtered off and recrystallized from ethanol; yield: 1.1 g.; M.P. 174–175° C.
$C_{17}H_{12}FNO_6$ (345.3). Calculated (percent): N, 4.06; F, 5.50. Found (percent): N, 4.02; F, 5.70.

(b) 2-(5-nitro-2-furfurylidene)-6-fluoro-7-hydroxy-1-tetralone 400 mg. of 2-(5-nitro-2-furfurylidene) - 7 - acetoxy-6-fluoro-1-tetralone is boiled under reflux in 60 ml. of ethanol and 20 ml. of concentrated hydrochloric acid for 2 hours. The ethanol is distilled off, and the thus-obtained crystallized product is filtered off, washed with water, and recrystallized from ethanol. Yield: 200 mg.; M.P. 248–249° C. (decomposition).
$C_{15}H_{10}FNO_5$ (303.3). Calculated (percent): N, 4.62; F, 6.26. Found (percent): N, 4.49; F, 5.96.

EXAMPLE 24

2-(5-nitro-2-furfurylidene)-8-hydroxy-5-methoxy-1-tetralone 384 mg. (2 mmol) of 8-hydroxy-5-methoxy-1-tetralone and 282 mg. (2 mmol) of 5-nitrofurfural are boiled under reflux in 5 ml. of acetic anhydride for 2 hours, and the acetic anhydride and the residue are recrystallized from ethanol. The thus-obtained 2-(5-nitro-2-furfurylidene)-8-acetoxy - 5 - methoxy-1-tetralone (170 mg.) is boiled under reflux in 15 ml. of ethanol and 5 ml. of concentrated hydrochloric acid for 2 hours. The thus-precipitated solid product is filtered off, washed with ethanol/water 1:1, and dried. Yield: 110 mg.
$C_{16}H_{13}NO_6$ (315.3). Calculated (percent): N, 4.44. Found (percent): N, 4.47.

The preceding examples can be repeated with similar success by substituting the generically and specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

What is claimed is:
1. A compound of the formula

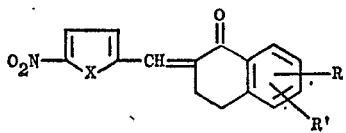

wherein X is an oxygen atom or sulfur atom, an —NH— group or an —NCH$_3$— group; R is hydroxy, acryloxy, hydroxyalkoxy, acyloxyalkoxy, alkoxyalkoxy, dialkylaminoalkoxy, pyrrolidinoalkoxy, piperidinoalkoxy, morpholinoalkoxy, piperazinoalkoxy, acylamino, amino, alkylsulfonylamino, monoalkylamino, dialkylamino, carboxy, carbalkoxy or nitro; and R' is a hydrogen atom, a halogen atom, alkyl, hydroxy, acyloxy or alkoxy, wherein acyl in each instance is the acyl radical of an aliphatic or aromatic carboxylic or sulfonic acid containing 1–10 carbon atoms, and alkyl and alkoxy in each instance contain 1–5 carbon atoms.

2. An acid addition salt of a compound of claim 1.
3. A compound of claim 1 wherein X is —O—.
4. A compound of claim 1 wherein R is a 6-position substituent.
5. A compound of claim 3 wherein R is a 6-position substituent.
6. A compound of claim 5 wherein R' is H.
7. A compound of claim 6 wherein R is —OH.
8. A compound of claim 6 wherein R is —NH$_2$.
9. A compound of claim 6 wherein R is di-lower-alkylamino.
10. A compound of claim 6 wherein R is pyrrolidino, piperidino or morpholino.
11. A compound of claim 6 wherein R is 2-hydroxyethoxy.
12. A compound of claim 6 wherein R is di-loweralkylaminoethoxy.
13. A compound of claim 6 selected from the group consisting of
2-(5-nitro-2-furfurylidene)-6-hydroxy-1-tetralone,
2-(5-nitro-2-furfurylidene)-6-acetoxy-1-tetralone,
2-(5-nitro-2-furfurylidene)-6-n-butyryloxy-1-tetralone,
2-(5-nitro-2-furfurylidene)-6-propionyloxy-1-tetralone and
2-(5-nitro-2-furfurylidene)-6-methanesulfonyloxy-1-tetralone.
14. A compound of claim 3, 2 - (5-nitro-2-furfurylidene)-7-nitro-1-tetralone.
15. A compound of claim 6 selected from the group consisting of
2-(5-nitaro-2-furfurylidene)-6-hydroxyethoxy-1-tetralone,
2-(5-nitro-2-furfurylidene)-6-(2-ethoxyethoxy-1-tetralone and
2-(5-nitro-2-furfurylidene)-6-acetoxyethoxy-1-tetralone.
16. A compound of claim 6 selected from the group consisting of
2-(5-nitro-2-furfurylidene)-6-(2-dimethylaminoethoxy)-1-tetralone,
2-(5-nitro-2-furfurylidene)-6-(2-pyrrolidinoethoxy)-1-tetralone,
2-(5-nitro-2-furfurylidene)-6-(2-morpholinoethoxy-1-tetralone and
2-(5-nitro-2-furfurylidene)-6-(2piperidinoethoxy)-1-tetralone.
17. A compound of claim 6 selected from the group consisting of
2-(5-nitro-2-furfurylidene)-6-amino-1-tetralone,
2-(5-nitro-2-furfurylidene)-6-acetylaminoltetralone,
2-(5-nitro-2-furfurylidene)-6-methanesulfonylamino-1-tetralone and
2(5-nitro-2-furfurylidene)-6-dimethylamino-1-tetralone.
18. A compound of claim 6 selected from the group consisting of 2 - (5-nitro-2-furfurylidene)-6-carboxy-1-tetralone and 2 - (5 - nitro-2-furfurylidene)-6-carbomethoxy-1-tetralone.
19. A compound of claim 23, 2-(5-nitro-2-thenylidene)-6-acetoxy-1-tetralone.
20. A compound of claim 23 selected from the group consisting of
2-(5-nitro-2-pyrrolylmethylene)-6-carbomethoxy-1-tetralone and
2-(5-nitro-N-methyl-2-pyrrolylmethylene)-6-hydroxy-1-tetralone.
21. A compound of claim 3 selected from the group consisting of
2-(5-nitro-2-furfurylidene)-7-acetoxy-6-fluoro-1-tetralone,
2-(5-nitro-2-furfurylidene)-6-fluoro-7-hydroxy-1-tetralone and
2-(5-nitro-2-furfurylidene)8-hydroxy-5-methoxy-1-tetralone.

22. A compound of claim 1 wherein X is —S—.
23. A compound of claim 22 wherein R' is H.
24. A compound of claim 1 wherein X is —NH— or —NCH₃—.
25. A compound of claim 24 wherein R' is H.

References Cited
FOREIGN PATENTS 25,256  11/1965  Japan _____ 260—240 A

OTHER REFERENCES

Albrecht et al.: Annalen der Chemie, vol. 736, pages 110 to 125 (June 1970).

JOHN D. RANDOLPH, Primary Examiner

U.S. Cl. X.R.

424—244, 248, 250, 251, 267, 269, 270, 272, 273, 274, 275, 285; 260—240 R

UNITED STATES PATENT OFFICE
CERTIFICATE OF CORRECTION

Patent No. 3,660,385  Dated May 2, 1972

Inventor(s) RUDOLF ALBRECHT ET AL.

It is certified that error appears in the above-identified patent and that said Letters Patent are hereby corrected as shown below:

COLUMN 1, line 60, after "pyrrolidinoalkoxy", insert -- piperidinoalkoxy --.

COLUMN 4, line 35, after "acid" second occurrence, insert -- and thereafter optionally saponifying an acyloxy group, -- line 35, "acryl" should read -- acyl --.

COLUMN 9, Claim 1, line 64, "acryl" should read -- acyl --.

COLUMN 10, Claim 15, line 31, "nitaro" should read -- nitro --.

COLUMN 10, Claim 20, line 61, "23" should read -- 25 --.

Signed and sealed this 3rd day of July 1973.

(SEAL)
Attest:

EDWARD M. FLETCHER, JR.
Attesting Officer

Rene Tegtmeyer
Acting Commissioner of Patents